(12) United States Patent
Hwang et al.

(10) Patent No.: US 7,745,048 B2
(45) Date of Patent: Jun. 29, 2010

(54) RECHARGEABLE LITHIUM POLYMER BATTERY

(75) Inventors: Duck-Chul Hwang, Suwon-si (KR); Yun-Suk Choi, Suwon-si (KR); Chung-Kun Cho, Suwon-si (KR); Sang-Mock Lee, Suwon-si (KR)

(73) Assignee: Samsung SDI Co., Ltd., Suwon-si (KR)

( * ) Notice: Subject to any disclaimer, the term of this patent is extended or adjusted under 35 U.S.C. 154(b) by 967 days.

(21) Appl. No.: 10/970,824

(22) Filed: Oct. 21, 2004

(65) Prior Publication Data

US 2005/0089759 A1   Apr. 28, 2005

(30) Foreign Application Priority Data

Oct. 23, 2003   (KR) ............... 10-2003-0074218

(51) Int. Cl.
*H01M 4/68* (2006.01)

(52) U.S. Cl. ............... 429/245; 429/246; 429/234; 429/233; 429/231.1; 429/231.3; 429/224; 429/231.95; 429/231.8; 429/324; 429/337; 429/338; 429/340; 429/342; 429/343

(58) Field of Classification Search ........... 429/245, 429/246, 234, 233, 231.1, 231.3, 224, 231.95, 429/231.8, 324, 337, 338, 340, 342, 343
See application file for complete search history.

(56) References Cited

U.S. PATENT DOCUMENTS

| | | | |
|---|---|---|---|
| 4,686,160 A * | 8/1987 | Yoshino et al. ............. 429/213 |
| 5,314,765 A | 5/1994 | Bates | |
| 5,658,686 A | 8/1997 | Akashi | |
| 5,972,539 A | 10/1999 | Hasegawa et al. | |
| 6,051,340 A | 4/2000 | Kawakami et al. | |
| 6,410,189 B1 * | 6/2002 | Yamada et al. ............. 429/234 |
| 6,432,584 B1 | 8/2002 | Visco et al. | |
| 6,933,077 B2 * | 8/2005 | Sudano et al. ............. 429/234 |
| 6,933,080 B2 | 8/2005 | Lee et al. | |
| 7,018,739 B2 | 3/2006 | Lee et al. | |
| 2003/0104282 A1 * | 6/2003 | Xing et al. ................. 429/245 |

FOREIGN PATENT DOCUMENTS

| | | |
|---|---|---|
| CN | 1388172 A | 1/2003 |
| CN | 1412870 A | 4/2003 |
| JP | 11-97063 A | 4/1999 |
| JP | 11-233116 A | 8/1999 |
| JP | 2002-513991 A | 5/2002 |
| JP | 2004-207113 A | 7/2004 |

(Continued)

OTHER PUBLICATIONS

The abstract of Xing et al. US 2003/0104282, cited in A above, Jun. 2003.*

(Continued)

*Primary Examiner*—Laura S Weiner
(74) *Attorney, Agent, or Firm*—Christie, Parker & Hale, LLP (57) ABSTRACT

Disclosed is a rechargeable lithium polymer battery comprising a negative electrode including a negative active material layer deposited on a substrate, a positive electrode including a positive active material; and a polymer electrolyte including a lithium salt, an organic solvent, and a polymer.

33 Claims, 1 Drawing Sheet

FOREIGN PATENT DOCUMENTS

WO          WO 02/50933 A2     6/2002

OTHER PUBLICATIONS

Patent Abstracts of Japan, Publication No. 11-097063, dated Apr. 9, 1999, in the name of Tatsunori Sera.

Patent Abstracts of Japan, Publication No. 11-233116, dated Aug. 27, 1999, in the name of Takao Ogura et al.

Patent Abstracts of Japan, Publication No. 2004-207113, dated Jul. 22, 2004, in the name of Kenichi Kawase et al.

* cited by examiner

FIG. 1

RECHARGEABLE LITHIUM POLYMER BATTERY

CROSS REFERENCE TO RELATED APPLICATION

This application claims priority to and is based on Korean Patent Application No. 10-2003-0074218 filed in the Korean Intellectual Property Office on Oct. 23, 2003, the entire disclosure of which is incorporated herein by reference.

FIELD OF THE INVENTION

The present invention relates to a rechargeable lithium polymer battery, and more particularly, to a rechargeable lithium polymer battery exhibiting improved cycle life characteristics.

BACKGROUND OF THE INVENTION

Rechargeable lithium batteries which are attractive as power sources for portable electronics, use organic electrolyte, and exhibit twice the discharge capacity of conventional batteries with an alkaline aqueous electrolyte solution while exhibiting high energy density.

Positive active materials use oxides of lithium and transition metals having a structure capable of intercalating lithium. Examples include $LiCoO_2$, $LiMn_2O_4$, and $LiNi_{1-x}Co_xO_2$ (where $0<x<1$).

Attempts have been made to use lithium metal as a negative active material for rechargeable lithium batteries because of its high energy density. However, lithium metal causes serious problems with dendrite formation on the surface of the lithium metal during charging and discharging. This may cause a short circuit and may further increase the reactivity of the lithium metal so that the lithium metal reacts with the electrolyte to form a polymer film without ionic conductivity on the surface of the lithium metal. As a result, the battery resistance increases abruptly, preventing smooth charging and discharging.

Such problems have been addressed by replacing lithium metal with carbonaceous materials which are capable of intercalating and deintercalating lithium ions. Carbonaceous materials have no shortcomings associated with dendrites and have advantages such as good voltage flatness and relatively good cycle life characteristics. However, such carbonaceous materials tend to be highly-reactive with organic electrolytes, exhibit low power as a result of the slow diffusion rate of lithium in the material, tend to have initial irreversible capacity, and batteries made from such materials can exhibit high volume expansion or swelling.

The shortcomings are more complicated for carbonaceous materials than for lithium metal. Thus, attempts to return to the use of lithium metal by addressing dendrite formation and giving prolonged cycle life characteristics have attracted attention. One approach is found in U.S. Pat. No. 6,051,340 which discloses a negative electrode including a metal capable of being alloyed with lithium and a metal incapable of being alloyed with lithium. The metal incapable of being alloyed with lithium acts as a current collector, and the metal capable of being alloyed with lithium forms an alloy with lithium ions released from a positive electrode during charging. The alloy acts as a negative active material and the negative electrode includes lithium during the charging.

SUMMARY OF THE INVENTION

It is an aspect of the present invention to provide a rechargeable lithium polymer battery exhibiting good cycle life characteristics.

This and other aspects may be achieved by a rechargeable lithium battery comprising a negative electrode including a negative active material deposited on a substrate; a positive electrode including a positive active material; and a polymer electrolyte including a lithium salt, an organic solvent, and a polymer.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawing, wherein.

DETAILED DESCRIPTION OF THE INVENTION

The present invention uses lithium metal as a negative electrode for providing high-capacity rechargeable lithium polymer batteries. In the present invention, lithium metal is deposited on a substrate in order to inhibit dendrite formation of a bare lithium metal negative electrode. Furthermore, a polymer electrolyte is used in order to solve shortcomings associated with the reaction between lithium metal and an electrolytic solution. Thus, the present invention can provide a rechargeable lithium battery exhibiting good cycle life characteristics.

Embodiments of the polymer electrolyte of the present invention include both solid polymer electrolytes without an electrolytic solution and gel polymer electrolytes with an electrolytic solution. The gel polymer electrolytes include polymer electrolytes prepared by polymerizing a monomer and an initiator, or prepared by using a polymer itself.

Studies on the use of lithium metal deposited on a substrate as a negative electrode and polymer electrolyte have hitherto not been undertaken. For example, U.S. Pat. Nos. 5,972,539 and 5,658,686, while disclosing a flame retardant gel electrolyte, do not disclose the use of lithium metal deposited on a substrate. Thus, it is well understood to one in the related art that the cycle life characteristics improvement effect of the present invention by using lithium metal deposited on a substrate as a negative electrode and polymer electrolyte cannot be obtained from these cited references.

The negative electrode of the present invention includes a negative active material layer deposited on a substrate.

The negative active material may be lithium metal, an alloy of lithium, or a material which reversibly forms a compound. Suitable materials include Al, Mg, K, Na, Ca, Sr, Ba, Si, Ge, Sb, Pb, In, Zn and mixtures or alloys thereof.

The substrate may be a current collector, a supporting polymer film, or a current collector deposited on a supporting polymer film.

The current collector includes one or more elements selected from Ni, Ti, Cu, Ag, Au, Pt, Fe, Co, Cr, W, Mo, Al, Mg, K, Na, Ca, Sr, Ba, Si, Ge, Sb, Pb, In, or Zn.

A polymer in the supporting polymer preferably has a melting point of 80° C. or more, and examples of such polymers include polyethylene terephthalate, polyimide, polytetrafluoroethylene, polyethylene naphthalate, polypropylene, polyethylene, polyester, polyvinylidene fluoride, and polysulfone. The supporting film preferably has a thickness of 1 to 200 µm, more preferably 2 to 100 µm, and most preferably 3 to 50 µm. If the thickness of the polymer film is less than 1 µm, it is difficult to handle. If the thickness of the polymer film is more than 200 µm, the energy density is relatively reduced.

The supporting polymer film may be a silicon-based release layer. Such a release layer may be formed using a silicon-based compound as represented by formula 1, and such a compound may be applied using general coating techniques such as roll coating, spray coating or gravure coating.

(1)

where $R_1$, $R_2$, $R_3$, and $R_4$ are identically or independently selected from $C_1$-$C_{18}$ linear alkyls, $C_1$-$C_{18}$ branched alkyls, $C_3$-$C_{18}$ cyclic alkyls, $C_2$-$C_{18}$ alkenyls, $C_6$-$C_{18}$ aryls, $C_6$-$C_{18}$ aralkyls, $C_1$-$C_{18}$ halogenated alkyls, $C_6$-$C_{18}$ halogenated aryls, $C_6$-$C_{18}$ halogenated aralkyls, phenyls, mercaptans, methacrylates, acrylates, epoxies, and vinyl ethers; and n and m are the same or different numerical values from 1 to 100,000.

When the current collector deposited on the supporting polymer is used as the substrate, the thickness of the deposited current collector is preferably 50 Å to 30,000 Å, more preferably 60 to 30,000 Å, and most preferably 75 to 10,000 Å. If the thickness is less than 50 Å, the action as the current collector is not sufficient, and if the thickness is more than 30,000 Å, energy density decreases.

In the negative electrode of the present invention, the negative active material layer deposited on the substrate preferably has a thickness of 1 to 100 µm, more preferably 2 to 90 µm, and most preferably 3 to 80 µm. Where the thickness is thinner than 1 µm the capacity abruptly decreases, and where the thickness is more than 100 µm there is reduced energy density and a decrease in the N/P ratio which is the ratio of the required amount of negative active material to the positive electrode capacity.

The negative electrode of the present invention may further include a protection layer on a surface of the negative active material layer. The protection layer can be a single layer or can include multiple layers comprising polymer materials, inorganic materials or mixtures thereof. Suitable inorganic materials include LiPON, $Li_2CO_3$, $Li_3N$, $Li_3PO_4$ and $Li_5PO_4$. Such an inorganic material preferably has a thickness of 10 to 20,000 Å. If the thickness of a protection layer made from an inorganic material is less than 10 Å, the protection layer is too thin and can be easily damaged. When the thickness of the protection layer is more than 20,000 Å, the ionic conductivity and the energy density decrease.

Suitable polymers for the protection layer include polyvinylidene fluoride, copolymers of polyvinylidene fluoride and hexafluoropropylene, poly(vinyl acetate), poly(vinyl butyral-co-vinyl alcohol-co vinyl acetate), poly(methylmethacrylate-co-ethyl acrylate), polyacrylonitrile, polyvinyl chloride-co-vinyl acetate, polyvinyl alcohol, poly(1-vinylpyrrolidone-co-vinyl acetate), cellulose acetate, polyvinylpyrrolidone, polyacrylate, polymethacrylate, polyolefin, polyurethane, polyvinyl ether, acrylonitrile-butadiene rubber, styrene-butadiene rubber, acrylonitrile-butadiene-styrene, tri-block polymers of sulfonated styrene/ethylene-butylene/styrene, polyethylene oxide, and combinations thereof. A polymer protection layer preferably has a thickness of 100 Å to 10 µm. If the thickness of the protection layer is less than 100 Å, the protection layer is too thin and can be damaged easily. When the thickness of the protection layer is more than 10 µm, the ionic conductivity and the energy density decrease.

The rechargeable lithium battery of the present invention also includes a positive electrode. The positive electrode comprises a positive active material including a compound being capable of reversibly intercalating and deintercalating lithium ions. Alternatively, the positive active material may include elemental sulfur ($S_8$), or a sulfur-based compound. Examples of the compound include compounds and combinations of compounds represented by formulas 2 to 15:

$$LiAO_2 \tag{2}$$

$$LiMn_2O_4 \tag{3}$$

$$Li_aNi_bB_cM_dO_2 \text{ (where } 0.95 \leq a \leq 1.1, 0 \leq b \leq 0.9,\\ 0 \leq c \leq 0.5, \text{ and } 0.001 \leq d \leq 0.1\text{)} \tag{4}$$

$$Li_aNi_bCo_cMn_dM_eO_2 \text{ (where } 0.95 \leq a \leq 1.1, 0 \leq b \leq 0.9,\\ 0 \leq c \leq 0.5, 0 \leq d \leq 0.5, \text{ and } 0.001 \leq e \leq 0.1\text{)} \tag{5}$$

$$Li_aAM_bO_2 \text{ (where } 0.95 \leq a \leq 1.1, \text{ and } 0.001 \leq b \leq 0.1\text{)} \tag{6}$$

$$Li_aMn_2M_bO_4 \text{ (where } 0.95 \leq a \leq 1.1, \text{ and}\\ 0.001 \leq b \leq 0.1\text{)} \tag{7}$$

$$DS_2 \tag{8}$$

$$LiDS_2 \tag{9}$$

$$V_2O_5 \tag{10}$$

$$LiV_2O_5 \tag{11}$$

$$LiEO_2 \tag{12}$$

$$LiNiVO_4 \tag{13}$$

$$Li_{(3-x)}F_2(PO_4)_3 \text{ (where } 0 \leq x \leq 3\text{)} \tag{14}$$

$$Li_{(3-x)}Fe_2(PO_4)_3 \text{ (where } 0 \leq x \leq 2\text{)} \tag{15}$$

where A is selected from Co, No, or Mn;

B is Co or Mn;

D is Ti or Mo;

E is selected from Cr, V, Fe, Sc, or Y;

F is selected from V, Cr, M, Co, Ni, or Cu; and

M is at least one transition metal or at least one lanthanide selected from Al, Cr, Mn, Fe, Mg, La, Ce, Sr, or V.

The positive active material may include a coating layer on a surface of the bare compound, or a mixture of the compound and a coating compound. The coating layer may include at least one compound selected from the group consisting of hydroxides of a coating element, oxyhydroxides thereof, oxycarbonates thereof, and hydroxycarbonates thereof. The compound may be amorphous or crystalline. The coating element may be Mg, Al, Co, K, Na, Ca, Si, Ti, V, Sn, Ge, Ga, B, As, Zr, or mixtures thereof. The coating process may be performed by any technique that does not adversely affect the physical properties of the positive active material. Examples include spray coating, immersion coating, etc., and such coating methods are not described in detail since they are well understood by those in the related art.

The sulfur-based compound may be $Li_2S_n$ (where $n \geq 1$) or a carbon-sulfur polymer $((C_2S_x)_n$, where $x=2.5$-$50$, and $n \geq 2$).

The polymer electrolyte is a gel polymer electrolyte that can be obtained by polymerization within a battery. The gel polymer electrolyte is prepared by adding the monomers that are to be reacted to form the polymer and an initiator to an electrolytic solution including a non-aqueous organic solvent and a lithium salt. The battery is then held for a given time at a temperature suitable for initiating polymerization. The initiator decomposes to generate nitrogen ($N_2$) or carbon dioxide ($CO_2$) and thus it does not remain present in the resulting polymer electrolyte.

The mixing ratio of the polymer-forming compound and the electrolyte solution is preferably 1:1 to 1:1000 by weight, and more preferably 1:5 to 1:200 by weight. If the amount of the electrolyte is present in an amount less than this range, too much gelation occurs which decreases the ionic conductivity. If the amount of the electrolyte is above this range, insufficient gelation occurs which permits movement of the electrolyte solution within the battery which can result in corrosion. In addition, the mixing ratio of the polymer-forming compound and the initiator is preferably 1:0.0001 to 1:0.5, and more preferably 1:0.001 to 1:0.2 If the amount of the initiator is less than this range, insufficient gelation occurs. If the amount of the initiator is more than this range, gas may be abruptly generated or unreacted initiators may adversely affect the battery performance.

The polymer-forming compound may be a compound with at least one carbon-carbon double bond at a terminal end. Examples include multifunctional acrylates (poly(ester) (metha)(acrylate) in which hydroxide groups in (polyester polyol) are partially or totally substituted with (metha)acrylic ester), poly(ethyleneglycol) dimethacrylate, poly(ethyleneglycol) diacrylate, poly(ethyleneglycol) divinylether ethylene glycol dimethacrylate, ethyleneglycol diacrylate, ethyleneglycol divinyl ether hexanediol diacrylate, tripropyleneglycol diacrylate, tetraethyleneglycol monoacrylate, caprolactone acrylate, and mixtures thereof.

Preferred polymer-forming compounds are represented by formulas 16 to 18:

(16)

where $R_a$ to $R_f$ are identically or independently selected from compounds represented by formulas 16a or 16b:

(16a)

(16b)

(17)

(18)

where $R_5$ is H or $CH_3$, n is a numerical value in the range of 1 to 100,000, and $R_6$ is H or $CH_3$.

The polyester has a number-average molecular weight of 150 to 100,000, has 5 to 500 hydroxide groups, and is obtained from the condensation-polymerization of hydroxyl carboxylic acid represented by formula 19:

$$HO-R_7-COOH \quad (19)$$

where $R_7$ is a $C_1$ to $C_{20}$ linear or branched alkylene.

The polyester polyol is a polymer obtained from opening polymerization of lactone represented by formula 20:

(20)

where $R_8$ is a $C_2$ to $C_{20}$ linear or a branched alkylene.

Alternatively, the polyester polyol is a polymer obtained from condensation polymerization of glycol represented by formula 21, preferably ethylene glycol or diethylene glycol, and dicarboxylic acid represented by formula 22, preferably adipic acid or succinic acid.

$$HO-R_9-OH \quad (21)$$

where $R_9$ is a $C_2$ to $C_{50}$ linear, branched, or cyclic hydrocarbon, and may include double bonds, aromatic rings, or ether bonds.

$$HOOC-R_{10}-COOH \quad (22)$$

where $R_{10}$ is a $C_1$ to $C_{20}$ linear, branched, or cyclic hydrocarbon, and may include double bonds, aromatic rings, or ether bonds.

The initiator is preferably a compound which decomposes to generate nitrogen ($N_2$) or carbon dioxide ($CO_2$). Examples include diacyl peroxides selected from dibenzoyl peroxide, succinic peroxide, dilauroyl peroxide, and didecanoyl peroxide; dialkyl peroxides selected from dicumyl peroxide, di-t-butylperoxide, and 2,5-dimetyl-2,5-di-(t-butylperoxy) hexane; peroxy esters selected from α-cumyl peroxyneodecanoate, 1,1-dimethyl-3-hydroxybutyl peroxy-2-ethylhexanoate, and t-butyl peroxy pivalate; tertiary alkyl hydroperoxides selected from 2,5-dihydroperoxy-2,5-dimethylhexane, cumene hydroperoxide, and t-butyl hydroperoxide; peroxy ketals selected from 2,2-di-(t-butylperoxy)butane, and ethyl 3,3-di-(t-butylperoxy) butylate; peroxydicarbonates selected from di(n-propyl) peroxy dicarbonate, di(sec-butyl)peroxy dicarbonate and di(2-ethylhexyl) peroxy dicarbonate; azos such as azobisisobutyronitrile; and combinations thereof.

Non-aqueous organic solvents include benzene, toluene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, fluorotoluene, 1,2-difluorotoluene, 1,3-difluorotoluene, 1,4-difluorotoluene, 1,2,3-trifluorotoluene, 1,2,4-trifluorotoluene, chlorotoluene, 1,2-dichlorotoluene, 1,3-dichlorotoluene, 1,4-dichlorotoluene, 1,2,3-trichlorotoluene, 1,2,4-trichlorotoluene, iodotoluene, 1,2-diiodotoluene, 1,3-diiodotoluene, 1,4-diiodotoluene, 1,2,3-triiodotolune, 1,2,4-triiodotoluene, R—CN (where R is a $C_2$-$C_{50}$ linear, branched, or cyclic hydrocarbon, and may include double bonds, aromatic rings, or ether bonds), dimethoxyformamide, methylacetate, xylene, cyclohexane, tetrahydrofurane, 2-methyltetrahydrofurane, cyclohexanone, ethanol, isopropyl alcohol, dimethyl carbonate, ethylmethyl carbonate, diethyl carbonate, methylpropyl carbonate, methyl propionate, ethyl propionate, methyl acetate, ethyl acetate, propyl acetate, dimethoxyethane, 1,3-dioxolane, diglyme, tetraglyme, ethylene carbonate, propylene carbonate, γ-butyrolactone, valerolactone, decanolide, mevalolactone, sulfolane and mixtures thereof.

Suitable lithium salts include $LiPF_6$, $LiBF_4$, $LiAsF_6$, $LiClO_4$, $LiCF_3SO_3$, $Li(CF_3SO_2)_2N$, $LiN(SO_2C_2F_5)_2$, $LiSbF_6$, $LiN(CF_3SO_2)_3$, $LiC_4F_9SO_3$, $LiAlO_4$, $LiAlCl_4$, $LiN(C_xF_{2x+1}SO_2)(C_yF_{2y+1}SO_2)$ (where x and y are natural numbers), LiCl, LiI or mixtures thereof.

The concentration of the lithium salt is suitably 0.1 to 2.0M in the electrolyte. If the concentration of the lithium salt is less than 0.1M, the conductivity of the electrolyte decreases, deteriorating the performance of the electrolyte. If the concentration of the lithium salt is more than 2.0M, the viscosity of the electrolyte increases, reducing the mobility of lithium ions.

Alternatively, the polymer electrolyte of the present invention may be prepared by coating a polymer solution on a negative electrode. The polymer solution is obtained from the addition of a polymer such as polyethylene oxide or polyvinyldene fluoride in a solvent such as acetonitrile, N-methyl pyrrolidone or tetrahydrofurane.

Figure 1:
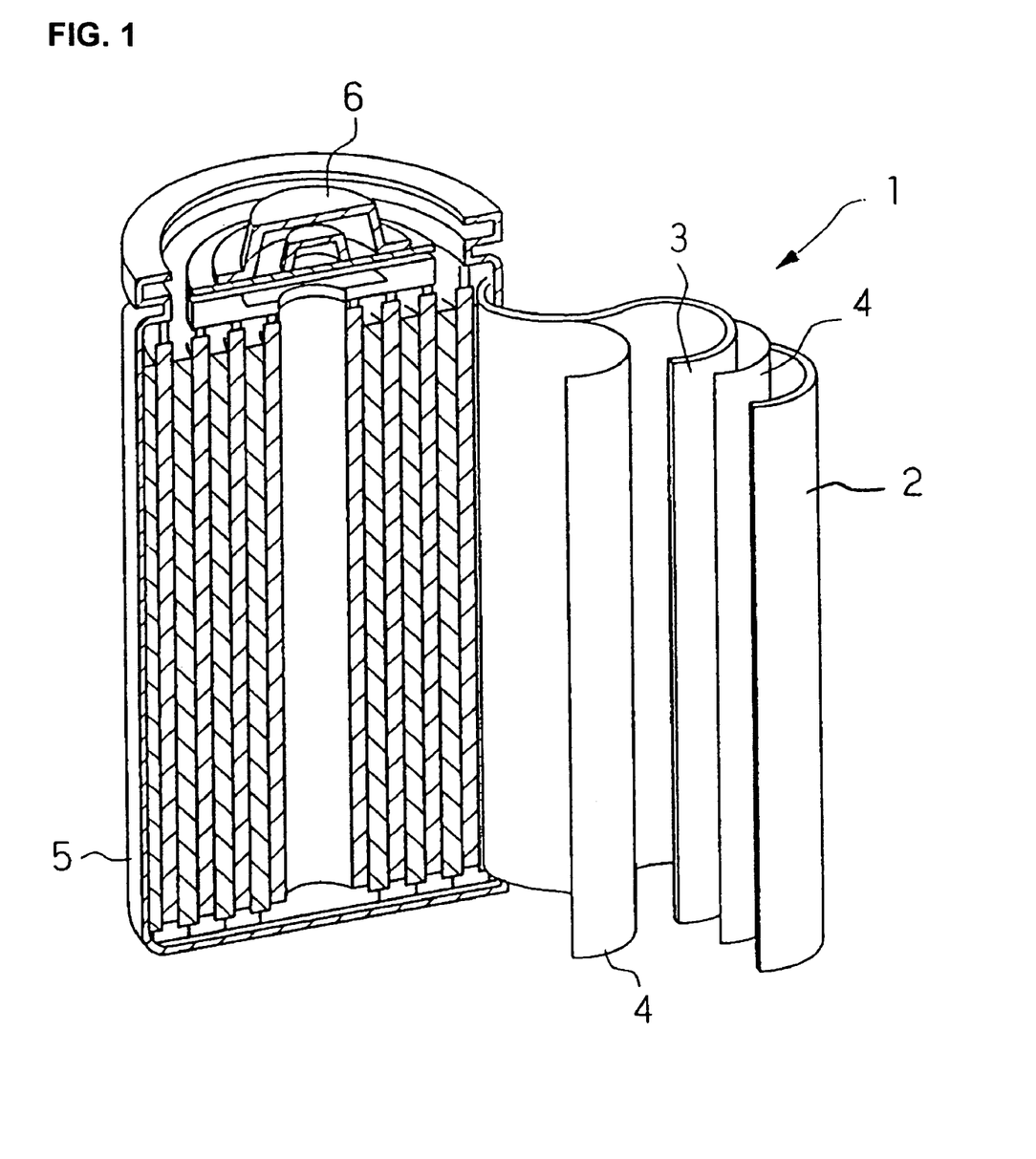
FIG. 1 is a schematic view showing an embodiment of a structure of the lithium secondary battery of the present invention.

An embodiment of the rechargeable lithium battery of the present invention is shown in FIG. 1. The rechargeable lithium battery includes a positive electrode 3; a negative electrode 2; a separator 4 interposed between the positive electrode 3 and the negative electrode 2; an electrolyte in which the positive electrode 2, the negative electrode 3, and the separator 4 are immersed; a cylindrical battery case 5; and a sealing portion 6. The configuration of the rechargeable lithium battery is not limited to the structure shown in FIG. 1, as it can be readily modified into a prismatic battery, a pouch-type battery, or various other batteries as are well understood in the related art.

The following examples illustrate the present invention in further detail, but it is understood that the present invention is not limited by these examples.

Gel Polymer Preparation

Synthesis Examples 1 to 9

Poly(ethylene glycol) dimethacrylate (PEGDMA) with an average molecular weight of 330 was selected as a polymer-forming compound, and was added to different amounts (see Table 1) of an electrolytic solution of 1M $LiPF_6$ in ethylene carbonate/dimethyl carbonate/ethylmethyl carbonate (30/30/40 volume ratio) and shaken for 10 minutes. A trace of α,α-azobisisobutyronitrile (AIBN) was added to the resulting material to prepare an electrolyte precursor solution, that was heated at 75° C. for 4 hours to form a gel. The physical properties of the obtained gel polymer electrolyte are presented in Table 1.

TABLE 1

| | Used amount (g) | | | |
|---|---|---|---|---|
| | Electrolytic solution | PEGDMA | AIBN | Physical properties |
| Synthesis Example 1 | 200 | 1 | 0.01 | Gelation, but occurrence of leakage of the electrolyte |
| Synthesis Example 2 | 175 | 1 | 0.01 | Gelation, but occurrence of leakage of the electrolyte |
| Synthesis Example 3 | 150 | 1 | 0.01 | Gelation |
| Synthesis Example 4 | 100 | 1 | 0.01 | Gelation |
| Synthesis Example 5 | 75 | 1 | 0.01 | Gelation |
| Synthesis Example 6 | 50 | 1 | 0.01 | Gelation |
| Synthesis Example 7 | 25 | 1 | 0.01 | Gelation |
| Synthesis Example 8 | 10 | 1 | 0.01 | Gelation |
| Synthesis Example 9 | 5 | 1 | 0.01 | Gelation |

As shown in Table 1, the gelation occurs when the amount of the electrolytic solution is 500 to 15,000% of the polymer-forming compound. An amount more than 15,000% causes the electrolytic solution to leak from the polymer matrix, even though gelation occurs.

The gel polymer matrix of Synthesis Example 4 was cast into a disk-type sample. The sample was attached to a stainless steel electrode, and the ionic conductivity was measured at room temperature. The result showed good ionic conductivity of $2.5 \times 10^{-3}$ (S/cm).

Synthesis Examples 10 to 18

A polymer-forming compound in which each of the four groups of the six $R_a$ to $R_f$ groups were substituted with formula 16b, and the remaining two groups were substituted with formula 16a in formula 16, was added to an electrolytic solution of 1.0M $LiPF_6$ in ethylene carbonate/dimethyl carbonate/ethylmethyl carbonate (30/30/40 volume ratio) and shaken for 10 minutes.

(16)

where $R_a$ to $R_f$ are independently selected from compounds represented by formula 16a or compounds represented by formula 16b:

A trace of α,α-azobisisobutyronitrile (AIBN) was added to the resulting material to prepare an electrolyte precursor solution. The solution was heated at 75° C. for 4 hours to form a gel. The physical properties of the obtained gel polymer electrolyte are presented in the following Table 2.

TABLE 2

| | Used amount (g) | | | |
|---|---|---|---|---|
| | Electrolytic solution | Compound represented by formula 16 | AIBN | Physical properties |
| Synthesis Example 10 | 200 | 1 | 0.01 | Gelation, but occurrence of leakage of the electrolyte |
| Synthesis Example 11 | 175 | 1 | 0.01 | Gelation, but occurrence of leakage of the electrolyte |
| Synthesis Example 12 | 150 | 1 | 0.01 | Gelation, but occurrence of leakage of the electrolyte |
| Synthesis Example 13 | 100 | 1 | 0.01 | Gelation |
| Synthesis Example 14 | 75 | 1 | 0.01 | Gelation |
| Synthesis Example 15 | 50 | 1 | 0.01 | Gelation |
| Synthesis Example 16 | 25 | 1 | 0.01 | Gelation |
| Synthesis Example 17 | 10 | 1 | 0.01 | Gelation |
| Synthesis Example 18 | 5 | 1 | 0.01 | Gelation |

As shown in Table 2, when the amount of the electrolytic solution is 500 to 10,000% of the polymer-forming compound, gelation occurs. At an amount more than 10,000%, the electrolytic solution leaks from the gel polymer even though gelation occurs.

The polymer matrix of Synthesis Example 13 was cast into a disk-type sample. The sample was attached to a stainless steel electrode, and the ionic conductivity was measured at room temperature. The result showed good ionic conductivity of $3.5 \times 10^{-3}$ (S/cm).

Fabrication of a Lithium Cell Using Poly(Ethylene Glycol) Dimethacrylate (PEGDMA) as a Polymer-Forming Compound Comparative Example 1

A $LiCoO_2$ positive active material, a polyvinylidene fluoride binder, and a Super-P conductive agent were mixed in an N-methyl pyrrolidone solvent at a weight ratio of 94/3/3 to prepare a positive active material slurry. The slurry was coated on an aluminum current collector and dried followed by pressing, thereby obtaining a positive electrode.

Using the positive electrode and a 200 μm lithium foil negative electrode, a lithium cell with a capacity of 650 mAh was fabricated. As an electrolyte, 1.0M $LiPF_6$ in ethylene carbonate/dimethyl carbonate/ethyl methyl carbonate (3/3/4 volume ratio) was used.

Comparative Example 2

A lithium cell with a capacity of 650 mAh was fabricated by assembling the cell using the positive electrode and the negative electrode used in Comparative Example 1 and the electrolyte precursor solution according to Synthesis Example 5 and allowing the assembled cell to stand at 75° C. for 4 hours. During the standing step, the electrolyte precursor solution was polymerized and hardened to produce a gel polymer electrolyte.

Comparative Example 3

A $LiCoO_2$ positive active material, a polyvinylidene fluoride binder, and a Super-P conductive agent were mixed in an N-methyl pyrrolidone solvent in the weight ratio of 94/3/3 to prepare a positive active material slurry. The positive active material slurry was coated on an aluminum current collector and dried followed by pressing, thereby producing a positive electrode.

Copper with a thickness of 10,000 Å was deposited on both sides of a polyethylene terephthalate film with a thickness of 15 μm. Thereafter, lithium with a thickness of 20 μm was deposited on both sides of the copper-deposited polyethylene terephthalate film, to produce a negative electrode.

Using the positive electrode and the negative electrode, a lithium cell with a capacity of 650 mAh was fabricated. As an electrolyte, 1.0M $LiPF_6$ in ethylene carbonate/dimethyl carbonate/ethyl methyl carbonate (3/3/4 volume ratio) was used.

Example 1

A lithium cell with a capacity of 650 mAh was fabricated by assembling the cell using the positive electrode and the negative electrode used in Comparative Example 3 and the electrolyte precursor solution according to Synthesis Example 1 and allowing the assembled cell to stand at 75° C. for 4 hours. During the standing step, the electrolyte precursor solution was polymerized and hardened to produce a gel polymer electrolyte.

Example 2

A lithium cell was fabricated by the same procedure as in Example 1 except that an electrolyte with a composition according to Synthesis Example 2 was used.

Example 3

A lithium cell was fabricated by the same procedure as in Example 1 except that an electrolyte with a composition according to Synthesis Example 3 was used.

Example 4

A lithium cell was fabricated by the same procedure as in Example 1 except that an electrolyte with a composition according to Synthesis Example 4 was used.

Example 5

A lithium cell was fabricated by the same procedure as in Example 1 except that an electrolyte with a composition according to Synthesis Example 5 was used.

Example 6

A lithium cell was fabricated by the same procedure as in Example 1 except that an electrolyte with a composition according to Synthesis Example 6 was used.

Example 7

A lithium cell was fabricated by the same procedure as in Example 1 except that an electrolyte with a composition according to Synthesis Example 7 was used.

Example 8

A lithium cell was fabricated by the same procedure as in Example 1 except that an electrolyte with a composition according to Synthesis Example 8 was used.

Example 9

A lithium cell was fabricated by the same procedure as in Example 1 except that an electrolyte with a composition according to Synthesis Example 9 was used.

Measurement of Battery Performance

The cells according to Comparative Examples 1 to 3 and Examples 1 to 9 were charged at 0.2 C and discharged at 0.2 C three times (formation step), and charged at 0.5 C and discharged at 0.2 C three times (standard step). The discharge capacities were measured at the $3^{rd}$ cycle during the standard step, and the values are shown in Table 9 as a capacity. The cells were charged at 0.5 C and discharged at 1.0 C 50 times and then the cycle life characteristics (capacity retention %) were measured. The results are shown in Table 3.

TABLE 3

| | Negative electrode | Thickness of lithium (μm) | Type of electrolyte | Used amount (g) Electrolytic solution | PEGDMA | AIBN | Capacity (mAh) | Cycle life for $50^{th}$ (%) |
|---|---|---|---|---|---|---|---|---|
| Comparative Example 1 | Lithium foil | 100 | liquid electrolyte | 100 | 0 | 0 | 650 | 95 |
| Comparative Example 2 | Lithium foil | 100 | Gel polymer electrolyte according to Synthesis Example 5 | 75 | 1 | 0.01 | 650 | 95 |
| Comparative Example 3 | Deposited lithium | 20 | liquid electrolyte | 100 | 0 | 0 | 650 | 10 |
| Example 1 | Deposited lithium | 20 | Gel polymer electrolyte according to Synthesis Example 1 | 200 | 1 | 0.01 | 650 | 53 |
| Example 2 | Deposited lithium | 20 | Gel polymer electrolyte according to Synthesis Example 2 | 175 | 1 | 0.01 | 650 | 62 |
| Example 3 | Deposited lithium | 20 | Gel polymer electrolyte according to Synthesis Example 3 | 150 | 1 | 0.01 | 650 | 77 |
| Example 4 | Deposited lithium | 20 | Gel polymer electrolyte according to Synthesis Example 4 | 100 | 1 | 0.01 | 650 | 86 |
| Example 5 | Deposited lithium | 20 | Gel polymer electrolyte according to Synthesis Example 5 | 75 | 1 | 0.01 | 650 | 95 |
| Example 6 | Deposited lithium | 20 | Gel polymer electrolyte according to Synthesis Example 6 | 50 | 1 | 0.01 | 650 | 94 |
| Example 7 | Deposited lithium | 20 | Gel polymer electrolyte according to Synthesis Example 7 | 25 | 1 | 0.01 | 650 | 85 |
| Example 8 | Deposited lithium | 20 | Gel polymer electrolyte according to Synthesis Example 8 | 10 | 1 | 0.01 | 650 | 75 |
| Example 9 | Deposited lithium | 20 | Gel polymer electrolyte according to Synthesis Example 9 | 5 | 1 | 0.01 | 650 | 72 |

As shown in Table 3, the cycle life characteristics of the cells using the lithium foil negative electrode did not depend on the type of the electrolyte, i.e., liquid electrolyte (Comparative Example 1) or gel polymer electrolyte (Comparative Example 2). This result is considered to occur even though the electrolytic solution reacts with lithium metal to reduce the amount of the lithium metal that can participate in electrochemical reaction, as the remaining lithium can substantially guarantee the cycle life characteristics because a very large amount of lithium metal is initially present.

However, when the deposited thin lithium is used, the cells with gel polymers (Examples 1 to 9) exhibited better cycle life characteristics than the cell with liquid electrolyte (Comparative Example 3). This result is considered to occur because the movement of the electrolyte is largely repressed in the gel polymer electrolyte so that the reaction between the electrolytic solution and lithium is prevented, thereby inhibiting the damage of lithium.

Fabrication of a Cell Using a Compound of Formula 16

Comparative Example 4

A lithium cell was fabricated by the same procedure as in Comparative Example 2 except that the electrolyte precursor solution according to Synthesis Example 14 was used.

Example 10

A lithium cell was fabricated by the same procedure as in Example 1 except that the electrolyte precursor solution according to Synthesis Example 10 was used.

Example 11

A lithium cell was fabricated by the same procedure as in Example 1 except that the electrolyte precursor solution according to Synthesis Example 11 was used.

Example 12

A lithium cell was fabricated by the same procedure as in Example 1 except that the electrolyte precursor solution according to Synthesis Example 12 was used.

Example 13

A lithium cell was fabricated by the same procedure as in Example 1 except that the electrolyte precursor solution according to Synthesis Example 13 was used.

Example 14

A lithium cell was fabricated by the same procedure as in Example 1 except that the electrolyte precursor solution according to Synthesis Example 14 was used.

Example 15

A lithium cell was fabricated by the same procedure as in Example 1 except that the electrolyte precursor solution according to Synthesis Example 15 was used.

Example 16

A lithium cell was fabricated by the same procedure as in Example 1 except that the electrolyte precursor solution according to Synthesis Example 16 was used.

Example 17

A lithium cell was fabricated by the same procedure as in Example 1 except that the electrolyte precursor solution according to Synthesis Example 17 was used.

Example 18

A lithium cell was fabricated by the same procedure as in Example 1 except that the electrolyte precursor solution according to Synthesis Example 18 was used.

Measurement of Battery Performance

The cells according to Comparative Examples 1, 3 to 4, and Examples 10 to 18 were charged at 0.2 C and discharged at 0.2 C three times (formation step), and charged at 0.5 C and discharged at 0.2 C three times (standard step). The discharge capacities were measured at the $3^{rd}$ cycle during the standard step, and the values are shown in Table 4 as capacities. The cells were charged at 0.5 C and discharged at 1.0 C 50 times, and the cycle life characteristics (capacity retention %) were measured. The results are presented in Table 4.

TABLE 4

|  | Negative electrode | Thickness of lithium (μm) | Type of Electrolyte | Used amount (g) | | | Capacity (mAh) | Cycle life for $50^{th}$ (%) |
|---|---|---|---|---|---|---|---|---|
|  |  |  |  | Electrolytic solution | PEGDMA | AIBN |  |  |
| Comparative Example 1 | Lithium foil | 100 | Liquid Electrolyte | 100 | 0 | 0 | 650 | 95 |
| Comparative Example 4 | Lithium foil | 100 | Gel polymer of Synthesis Example 14 | 75 | 1 | 0.01 | 650 | 95 |
| Comparative Example 3 | Deposited lithium | 20 | Electrolytic solution | 100 | 0 | 0 | 650 | 10 |
| Example 10 | Deposited lithium | 20 | Gel polymer of Synthesis Example 10 | 200 | 1 | 0.01 | 650 | 45 |
| Example 11 | Deposited lithium | 20 | Gel polymer of Synthesis Example 11 | 175 | 1 | 0.01 | 650 | 59 |
| Example 12 | Deposited lithium | 20 | Gel polymer of Synthesis Example 12 | 150 | 1 | 0.01 | 650 | 73 |
| Example 13 | Deposited lithium | 20 | Gel polymer of Synthesis Example 13 | 100 | 1 | 0.01 | 650 | 85 |

TABLE 4-continued

|  | Negative electrode | Thickness of lithium (μm) | Type of Electrolyte | Used amount (g) | | | Capacity (mAh) | Cycle life for 50$^{th}$ (%) |
|---|---|---|---|---|---|---|---|---|
|  |  |  |  | Electrolytic solution | PEGDMA | AIBN | | |
| Example 14 | Deposited lithium | 20 | Gel polymer of Synthesis Example 14 | 75 | 1 | 0.01 | 650 | 95 |
| Example 15 | Deposited lithium | 20 | Gel polymer of Synthesis Example 15 | 50 | 1 | 0.01 | 650 | 93 |
| Example 16 | Deposited lithium | 20 | Gel polymer of Synthesis Example 16 | 25 | 1 | 0.01 | 650 | 86 |
| Example 17 | Deposited lithium | 20 | Gel polymer of Synthesis Example 17 | 10 | 1 | 0.01 | 650 | 77 |
| Example 18 | Deposited lithium | 20 | Gel polymer of Synthesis Example 18 | 5 | 1 | 0.01 | 650 | 74 |

As shown in Table 4, the cycle life characteristics of the cells using the lithium foil negative electrode did not depend on the type of the electrolyte, i.e., liquid electrolyte (Comparative Example 1) or gel polymer electrolyte (Comparative Example 4). This result is considered to occur even though the electrolytic solution reacts with lithium metal to reduce the amount of the lithium metal that can participate in the electrochemical reaction, because the remaining lithium can substantially guarantee the cycle life characteristics because a very large amount of lithium metal is initially present.

However, when the deposited thin lithium is used, the cells with the gel polymer (Examples 10 to 18) exhibited better cycle life characteristics than the cell with electrolytic solution (Comparative Example 3). This result is considered to occur because the movement of the electrolyte is largely repressed in the gel polymer electrolyte so that the reaction between the electrolytic solution and lithium is prevented, thereby inhibiting the damage of lithium.

Example 19

A LiCoO$_2$ positive active material, a polyvinylidene fluoride binder, and a Super-P conductive agent were mixed in an N-methyl pyrrolidone solvent at a weight ratio of 94/3/3 to prepare a positive active material slurry. The slurry was coated on an aluminum current collector and dried followed by pressing, thereby obtaining a positive electrode.

Copper with a thickness of 1000 Å was deposited on both sides of a 5 μm polyethylene terephthalate film. Lithium with a thickness of 20 μm was deposited on both sides of the copper deposited film. The resulting polyethylene terephthalate film was coated with a polyethylene oxide in acetonitrile and dried, thereby producing a negative electrode.

Using the positive electrode and the negative electrode, a lithium cell with a capacity of 650 mAh was fabricated. At this time, as an electrolyte, 1.0M LiPF$_6$ in ethylene carbonate/dimethyl carbonate/ethyl methyl carbonate (3/3/4 volume ratio) was used.

Example 20

A lithium cell was fabricated by the same procedure as in Example 19 except that a solution of polyvinylidene fluoride in N-methyl pyrrolidone was coated with the resulting polyethylene terephthalate film.

Example 21

A lithium cell was fabricated by the same procedure as in Example 19 except that a solution of polyvinylchloride in tetrahydrofurane was coated with the resulting polyethylene terephthalate film.

Measurement of Battery Performance

The cells according to Comparative Examples 1 and 3, and Examples 19 to 21 were charged at 0.2 C and discharged at 0.2 C three times (formation step), and charged at 0.5 C and discharged at 0.2 C three times (standard step). The discharge capacities were measured at the 3$^{rd}$ cycle during the standard step, and the values are shown in Table 5 as a capacity. The cells were charged at 0.5 C and discharged at 1.0 C 50 times, and the cycle life characteristics (capacity retention %) were measured. The results are presented in Table 5.

TABLE 5

|  | Negative electrode | Thickness of lithium (μm) | Electrolytic solution | Polymer electrolyte | Capacity (mAh) | Cycle life for 50$^{th}$ (%) |
|---|---|---|---|---|---|---|
| Comparative Example 1 | Lithium foil | 100 | Liquid electrolyte | — | 650 | 95 |
| Comparative Example 3 | Deposited lithium | 20 | Electrolytic solution | — | 650 | 10 |
| Example 19 | Deposited lithium | 20 | Electrolytic solution | Polyethylene oxide | 650 | 95 |
| Example 20 | Deposited lithium | 20 | Electrolytic solution | Polyvinylidene fluoride | 650 | 92 |
| Example 21 | Deposited lithium | 20 | Electrolytic solution | Polyvinyl chloride | 650 | 93 |

It is evident from Table 5 that the cells according to Examples 19 to 21 with gel polymer electrolyte exhibited capacities corresponding to those according to Comparative Examples 1 and 3, but they exhibited better cycle life characteristics at the 50$^{th}$ cycles.

The inventive rechargeable lithium polymer battery employs deposited lithium and a gel polymer electrolyte so that the cycle life characteristics are enhanced from 10% to 95%.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. A rechargeable lithium polymer battery comprising:
   a negative electrode comprising a negative active material layer deposited on a substrate, wherein the substrate comprises a negative current collector deposited on a supporting polymer film, and the negative active material is selected from the group consisting of lithium metal, an alloy of lithium metal and a material which is capable of reversibly forming a compound with lithium;
   a positive electrode comprising a positive active material; and
   a polymer electrolyte comprising a lithium salt, an organic solvent, and a polymer, wherein the polymer electrolyte is prepared by assembling a battery using an electrolyte precursor solution obtained from addition of a polymer-forming compound and an initiator to an electrolytic solution comprising a non-aqueous organic solvent and a lithium salt; and polymerizing the battery at a temperature at which it starts polymerization, wherein the polymer-forming compound is selected from the group consisting of compounds represented by formulas 16 to 18 and combinations thereof:

(16)

where $R_a$ to $R_f$ are identically or independently selected from one represented by formulas 16a or 16b:

(16a)

(16b)

(17)

(18)

where $R_5$ is H or $CH_3$, n is from 1 to 100,000, and $R_6$ is H or $CH_3$.

2. The rechargeable lithium polymer battery of claim 1, wherein the current collector is selected from the group consisting of Ni, Ti, Cu, Ag, Au, Pt, Fe, Co, Cr, W, Mo, Al, Mg, K, Na, Ca, Sr, Ba, Si, Ge, Sb, Pb, In, Zn and combinations thereof.

3. The rechargeable lithium polymer battery of claim 1, wherein the current collector has a thickness of 60 Å to 30,000 Å.

4. The rechargeable lithium polymer battery of claim 3, wherein the current collector has a thickness of 75 Å to 10,000 Å.

5. The rechargeable lithium polymer battery of claim 1, wherein the supporting polymer film has a melting point of 80° C. or more.

6. The rechargeable lithium polymer battery of claim 1, wherein the supporting polymer film comprises a polymer selected from the group consisting of polyethylene terephthalate, polyimide, polytetrafluoroethylene, polyethylene naphthalate, polypropylene, polyethylene, polyester, polyvinylidene fluoride, and polysulfone.

7. The rechargeable lithium polymer battery of claim 1, further comprising a silicon-included releasing layer.

8. The rechargeable lithium polymer battery of claim 1, wherein the supporting polymer film has a thickness of 1 to 200 μm.

9. The rechargeable lithium polymer battery of claim 8, wherein the supporting polymer film has a thickness of 2 to 100 μm.

10. The rechargeable lithium polymer battery of claim 9, wherein the supporting polymer film has a thickness of 3 to 50 μm.

11. The rechargeable lithium polymer battery of claim 1, wherein the negative active material layer has a thickness of 1 to 100 μm.

12. The rechargeable lithium polymer battery of claim 11, wherein the negative active material layer has a thickness of 2 to 90 μm.

13. The rechargeable lithium polymer battery of claim 12, wherein the negative active material layer has a thickness of 3 to 80 μm.

14. The rechargeable lithium polymer battery of claim 1, wherein the negative active material is selected from the group consisting of Al, Mg, K, Na, Ca, Sr, Ba, Si, Ge, Sb, Pb, In, and Zn.

15. The rechargeable lithium polymer battery of claim 1, wherein the negative active material layer further comprises a protection layer on a surface thereof.

16. The rechargeable lithium polymer battery of claim 15, wherein the protection layer is a polymer material, an inorganic material or a mixture thereof.

17. The rechargeable lithium polymer battery of claim 16, wherein the protection layer comprises an inorganic material selected from the group consisting of LiPON, $Li_2CO_3$, $Li_3N$, $Li_3PO_4$, and $Li_5PO_4$.

18. The rechargeable lithium polymer battery of claim 16, wherein the protection layer comprises an inorganic material with a thickness of 10 to 20,000 Å.

19. The rechargeable lithium polymer battery of claim 16, wherein the protection layer comprises a polymer layer comprising a polymer selected from the group consisting of polyvinylidene fluoride, a copolymer of polyvinylidene fluoride and hexafluoropropylene, poly(vinyl acetate), poly(vinyl butyral-co-vinyl alcohol-co-vinyl acetate), poly(methylmethacrylate-co-ethyl acrylate), polyacrylonitrile, polyvinyl chloride-co-vinyl acetate, polyvinyl alcohol, poly(1-vinylpyrrolidone-co-vinyl acetate), cellulose acetate, polyvinyl pyrrolidone, polyacrylate, polymethacrylate, polyolefin, polyurethane, polyvinyl ether, acrylonitrile-butadiene rubber, styrene-butadiene rubber, acrylonitrile-butadiene-styrene, sulfonated styrene/ethylene-butylene/styrene triblock polymer, polyethylene oxide and combinations thereof.

20. The rechargeable lithium polymer battery of claim 16, wherein the protection layer comprises a polymer material with a thickness of 100 Å to 10 μm.

21. The rechargeable lithium polymer battery of claim 15, wherein the protection layer is provided as a single layer or as multiple layers.

22. The rechargeable lithium polymer battery of claim 1, wherein the positive active material is a compound which is capable of reversibly intercalating or deintercalating lithium ions.

23. The rechargeable lithium polymer battery of claim 1, wherein the positive active material is selected from the group consisting of compounds represented by formulas 2 to 15,

| | |
|---|---|
| $LiAO_2$ | (2) |
| $LiMn_2O_4$ | (3) |
| $Li_aNi_bB_cM_dO_2$ where $0.95 \leq a \leq 1.1, 0 \leq b \leq 0.9, 0 \leq c \leq 0.5$, and $0.001 \leq d \leq 0.1$ | (4) |
| $Li_aNi_bCo_cMn_dM_eO_2$ where $0.95 \leq a \leq 1.1, 0 \leq b \leq 0.9$, $0 \leq c \leq 0.5, 0 \leq d \leq 0.5$, and $0.001 \leq e \leq 0.1$ | (5) |
| $Li_aAM_bO_2$ where $0.95 \leq a \leq 1.1$, and $0.001 \leq b \leq 0.1$ | (6) |
| $Li_aMn_2M_bO_4$ where $0.95 \leq a \leq 1.1$, and $0.001 \leq b \leq 0.1$ | (7) |
| $DS_2$ | (8) |
| $LiDS_2$ | (9) |
| $V_2O_5$ | (10) |
| $LiV_2O_5$ | (11) |
| $LiEO_2$ | (12) |
| $LiNiVO_4$ | (13) |
| $Li_{(3-x)}F_2(PO_4)_3$ where $0 \leq x \leq 3$ | (14) |
| $Li_{(3-x)}Fe_2(PO_4)_3$ where $0 \leq x \leq 2$ | (15) | where A is selected from the group consisting of Co, No, or Mn; B is Co or Mn; D is Ti or Mo; B is selected from the group consisting of Cr, V, Fe, Sc, and Y; F is selected from the group consisting of V, Cr, M, Co, Ni, and Cu; and M is selected from the group consisting of transition metals, Al, Cr, Mn, Fe, Mg, La, Ce, Sr, V and combinations thereof.

24. The rechargeable lithium polymer battery of claim 1, wherein the positive active material is selected from the group consisting of inorganic sulfur ($S_8$), $Li_2S_n$ where $n \geq 1$ and carbon-sulfur polymers of the form $(C_2S_x)_n$, where x is from 2.5 to 50 and $n \geq 2$.

25. The rechargeable lithium polymer battery of claim 1, wherein the initiator decomposes to generate nitrogen ($N_2$) or carbon dioxide ($CO_2$).

26. The rechargeable lithium polymer battery of claim 25, wherein the initiator is selected from the group consisting of diacyl peroxides selected from the group consisting of dibenzoyl peroxide, succinic peroxide, dilauroyl peroxide, and didecanoyl peroxide; dialkyl peroxides selected from the group consisting of dicumyl peroxide, di-t-butyl peroxide and 2,5-dimethyl-2,5-di-(t-butylperoxy)hexane; peroxy esters selected from the group consisting of α-cumyl peroxy-neodecanoate, 1,1-dimethyl-3-hydroxybutyl peroxy-2-ethylhexanoate, and t-butyl peroxy pivalate; tertiary alkyl hydroperoxides selected from the group consisting of 2,5-dihydroperoxy-2,5-dimethylhexane, cumene hydroperoxide, and t-butyl hydroperoxide; peroxy ketals selected from the group consisting of 2,2-di-(t-butylperoxy)butane and ethyl 3,3-di-(t-butylperoxy) butylate; peroxydicarbonates selected from the group consisting of di(n-propyl)peroxy dicarbonate, di(sec-butyl)peroxy dicarbonate, and di(2-ethylhexyl)peroxy dicarbonate; and azos comprising azobisisobutyronitrile.

27. The rechargeable lithium polymer battery of claim 1, wherein the organic solvent is selected from the group consisting of benzene, toluene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, fluorotoluene, 1,2-difluorotoluene, 1,3-difluorotoluene, 1,4-difluorotoluene, 1,2,3-trifluorotoluene, 1,2,4-trifluorotoluene, chlorotoluene, 1,2-dichlorotoluene, 1,3-dichlorotoluene, 1,4-dichlorotoluene, 1,2,3-trichlorotoluene, 1,2,4-trichlorotoluene, iodotoluene, 1,2-diiodotoluene, 1,3-diiodotoluene, 1,4-diiodotoluene, 1,2,3-triiodotolune, 1,2,4-triiodotoluene, R—CN where R is a $C_2$-$C_{50}$ linear, branched, or cyclic hydrocarbon, and may include double bonds, aromatic rings, or ether bonds, dimethoxyformamide, methylacetate, xylene, cyclohexane, tetrahydrofurane, 2-methyltetrahydrofurane, cyclohexanone, ethanol, isopropyl alcohol, dimethyl carbonate, ethylmethyl carbonate, diethyl carbonate, methylpropyl carbonate, methyl propionate, ethyl propionate, methyl acetate, ethyl acetate, propyl acetate, dimethoxyethane, 1,3-dioxolane, diglyme, tetraglyme, ethylene carbonate, propylene carbonate, γ-butyrolactone, valerolactone, decanolide, mevalolactone, sulfolane and mixtures thereof.

28. The rechargeable lithium polymer battery of claim 1, wherein the lithium salt is selected from the group consisting of $LiPF_6$, $LiBP_4$, $LiAsF_6$, $LiClO_4$, $LiCP_3SO_3$, $Li(CF_3SO_2)_2N$, $LiN(SO_2C_2F_5)_2$, $LiSbF_6$, $LiN(CF_3SO_2)_3$, $LiC_4F_9SO_3$, $LiAlO_4$, $LiAlCl_4$, $LiN(C_xF_{2x+1}SO_2)(C_yF_{2y+1}SO_2)$ where x and y are natural numbers, LiCl, LiI and mixtures thereof.

29. The rechargeable lithium polymer battery of claim 1, wherein the polymer-forming compound and the electrolyte are provided in a weight ratio from 1:1 to 1:1,000.

30. The rechargeable lithium polymer battery of claim 29, wherein the polymer-forming compound and the electrolyte are provided in a weight ratio from 1:5 to 1:200.

31. The rechargeable lithium polymer battery of claim 1, wherein the polymer-forming compound and the initiator are provided in a weight ratio from 1:0.0001 to 1:0.5.

32. The rechargeable lithium polymer battery of claim 31, wherein the polymer-forming compound and the electrolyte are provided in a weight ratio from 1:0.001 to 1:0.2.

33. The rechargeable lithium polymer battery of claim 1, wherein the current collector has a thickness of 50 Å to 30,000 Å.

* * * * *

UNITED STATES PATENT AND TRADEMARK OFFICE
CERTIFICATE OF CORRECTION

PATENT NO. : 7,745,048 B2
APPLICATION NO. : 10/970824
DATED : June 29, 2010
INVENTOR(S) : Duck-Chul Hwang et al.

It is certified that error appears in the above-identified patent and that said Letters Patent is hereby corrected as shown below:

In the Claims

Column 20, Claim 28, line 45    Delete "$LiBP_4$,"
　　　　　　　　　　　　　　　　Insert -- $LiBF_4$, --

Delete "$LiCP_3SO_3$,"
　　　　　　　　　　　　　　　　Insert -- $LiCF_3SO_3$, --

Signed and Sealed this
Twenty-ninth Day of November, 2011

David J. Kappos
*Director of the United States Patent and Trademark Office*